United States Patent [19]

Buske et al.

[11] 4,201,499

[45] May 6, 1980

[54] MATERIAL TREATMENT SYSTEM

[75] Inventors: Walter E. Buske, Amesbury; Charles W. Hoyt, Belmont, both of Mass.

[73] Assignee: Wolverine Corporation, Methuen, Mass.

[21] Appl. No.: 928,530

[22] Filed: Jul. 27, 1978

[51] Int. Cl.[2] .............................................. B65G 53/16

[52] U.S. Cl. ........................................ 406/75; 406/86; 34/57 A; 34/57 B; 34/229

[58] Field of Search ..................... 34/164, 57 R, 57 A, 34/57 B, 222, 225, 224, 229, 232, 233, 156; 302/29, 30, 31; 406/88, 89, 91, 75, 86

[56] References Cited

U.S. PATENT DOCUMENTS

| | | | |
|---|---|---|---|
| 2,678,237 | 5/1954 | Allander et al. | 302/31 |
| 2,882,097 | 4/1959 | Hamren | 302/29 |
| 3,060,590 | 10/1962 | Brown | 34/20 |
| 3,229,377 | 1/1966 | Hoyt | 34/57 A |
| 3,262,217 | 7/1966 | Brown et al. | 34/164 |
| 4,109,394 | 8/1978 | Hoyt | 302/29 |

*Primary Examiner*—Larry I. Schwartz

[57] ABSTRACT

Improved material treatment apparatus includes an array of nozzles extending downwardly towards pan structure arranged for the substantially horizontal conveyance of solid particulate material. Gas is flowed through the nozzles at high velocity in an array of directed downwardly gas jets. The pan structure is gas impervious and impinging gas is deflected outwardly and upwardly through the bed of particles in fluidizing action and then exhausted at low velocity such that there is no significant particle entrainment in the exhaust gas stream. The angle of gas jets to the pan structure is at a small offset from the normal to the pan structure (less than ten degrees) and the small but effective resultant horizontal component of gas velocity is effective to modify the rate of movement of the particulate material through the treatment zone while maintaining the gas jet particle fluidization and treatment action in the treatment zone.

10 Claims, 10 Drawing Figures

MATERIAL TREATMENT SYSTEM

This invention relates to material treatment systems and more particularly to systems for treating solid particulate material with a gaseous medium brought into heat exchange or other treating relation therewith as the particles are conveyed in a substantially horizontal direction through a treatment zone.

Particulate material is advantageously treated by maintaining the particles in fluidized condition by gas flow that is in heat exchange or other treating relation with the particles as they are transported through a particle treatment zone. In treatment apparatus as shown in U.S. Pat. Nos. 3,060,590 and 3,229,377, for example, the particles to be treated are conveyed along a horizontal, gas impervious surface and gas jets are directed perpendicularly downwardly towards the impervious surface, the impinging gas velocity being sufficient to fluidize the particles, for uniform conditioning treatment, the gas then being exhausted upwards at markedly reduced velocity so that particles are not entrained in the exhaust flow but remain in the bed of particles being transported through the treatment zone. Such systems find extensive use in the food industry for processing particles such as coffee beans, grains, cereal flakes, etc. and in other industries for conditioning particles of plastic, rubber, etc.

The particle treatment process in such systems is a function of interrelated parameters that include particle characteristics such as size and density, the treatment gas temperature, the gas jet velocity, and the conveyor transport speed. In systems employing pan type, in contrast to belt type, conveyors for processing particular particles, the amounts that these parameters can be varied frequently is quite limited. For example, in apparatus of this type for a commercial cereal flake puffing process the residence time in the treatment zone (twenty feet in length) must be short (less than thirty seconds) and the jet velocity cannot exceed about six thousand fpm. To obtain the requisite short residence times in such processes, the oscillating conveyor is operated at its maximum rate (in the order of 400 cycles per minute) which imposes substantial mechanical stresses on the conveyor drives and materially increases maintenance requirements. The entire processing unit has been inclined on its horizontal axis to provide gravity assist and thus reduce the particle residence time, but tilting of such processing units is frequently difficult in practice and excessive inclination introduces major additional complications.

The present invention provides improved material treatment apparatus that includes an array of nozzles extending downwardly towards pan structure arranged for the substantially horizontal conveyance of solid particulate material. Gas is flowed through the nozzles at high velocity in an array of directed downwardly gas jets. The pan structure is gas impervious and impinging gas is deflected outwardly and upwardly through the bed of particles in fluidizing action and then exhausted at low velocity such that there is no significant particle entrainment in the exhaust gas stream. The angle of gas jets to the pan structure is at a small offset from the normal to the pan structure (less than ten degrees) and the small but effective resultant horizontal component of gas velocity is effective to modify the rate of movement of the particulate material through the treatment zone while maintaining the gas jet particle fluidization and treatment action in the treatment zone. The invention is useful with stationary pan structures and with mechanically driven pan structures such as oscillating or vibrating conveyor systems. The invention provides significant increase in capacity of such material treatment apparatus and in types of treatment processes.

In a preferred embodiment, the nozzles are elongated tubes with outlet orifices at their lower ends and expanded upper ends. The expanded upper ends of the tubes are pivotally suspended on an upper tube sheet which forms the lower wall of a supply plenum and the tubes extend through a parallel lower tube sheet. The two tube sheets are movable longitudinally relative to one another to adjust the tube angles in a simple and uniform manner. The tube array may be shifted in either direction to change the angle of jet impingement over a range of up to about ten degrees from the vertical while maintaining the uniformity of fluidizing action throughout the treatment zone. This small but effective inclination all or a portion of the nozzle tubes provides a horizontal component of force for accelerating or retarding the movement of particles through the treatment zone as desired and at rates that are a function of the angular inclination of the tubes.

In a particular embodiment for use with a stationary particle support pan, the tubes in alternate rows are fixed and the other tubes are periodically shifted to provide periodic horizontal pulsing of the fluidized bed that assists movement of particles through the treatment zone while continually maintaining the effective fluidization and treatment action of the gas jet array. In another embodiment, some or all of the tubes may be arranged for lateral shifting, an arrangement particularly useful in treating lumpy material, such as yeast, which has a tendency to agglomerate.

The invention provides simple, efficient and versatile material treatment apparatus. Other features and advantages of the invention will be seen as the following description of particular embodiments progresses, in conjunction with the drawings, in which.

Figure 4:
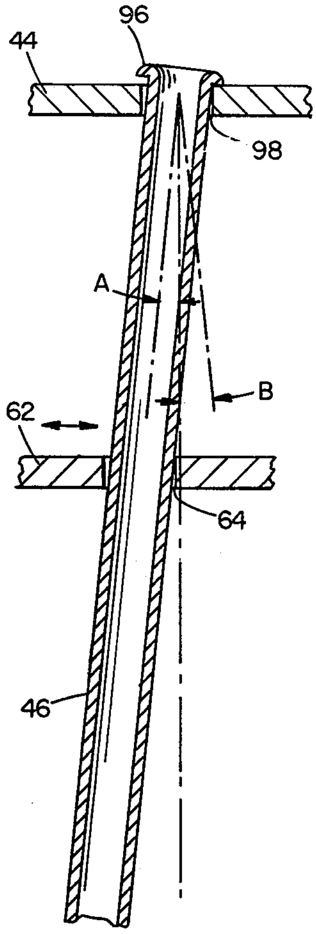
FIG. 4 is an enlarged sectional view of a portion of a nozzle tube, support and shifting mechanisms of the apparatus shown in FIG. 1.
Figure 4A:
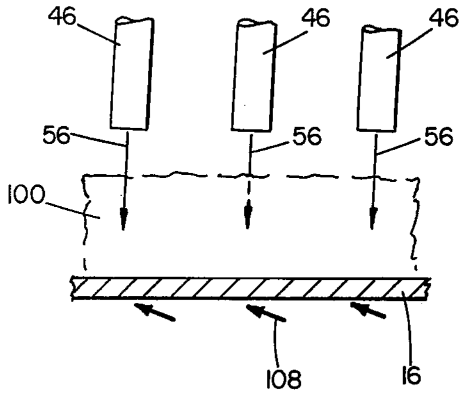
Figure 4B:
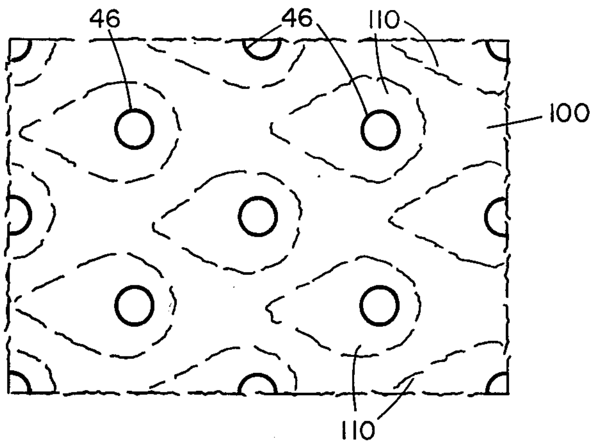
Figure 6A:
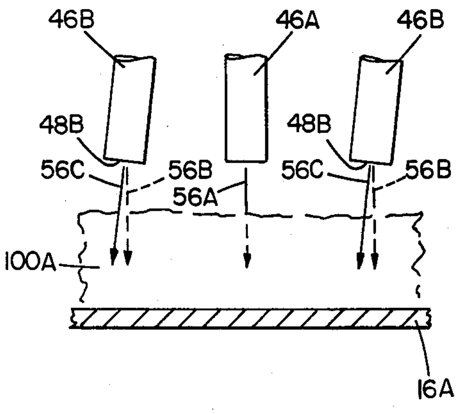
Figure 6B:
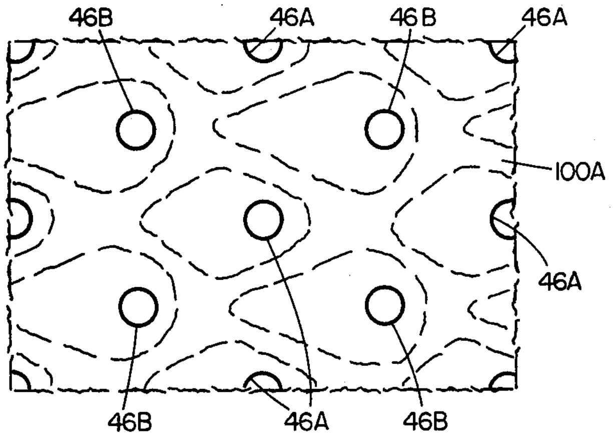

FIGS. **4*a* and 4*b*** are diagrammatic side and top views showing nozzle tubes in a transport accelerating position;

FIGS. **5*a* and 5*b* are diagrammatic side and top views similar to FIGS. 4*a* and 4*b* respectively showing nozzle tubes in transport retarding position; and FIGS. 6*a* and 6*b* are diagrammatic side and top views similar to FIGS. 4*a* and 4*b*** showing another embodiment of particle treatment apparatus in accordance with the invention.

DESCRIPTION OF PARTICULAR EMBODIMENTS

Figure 1:
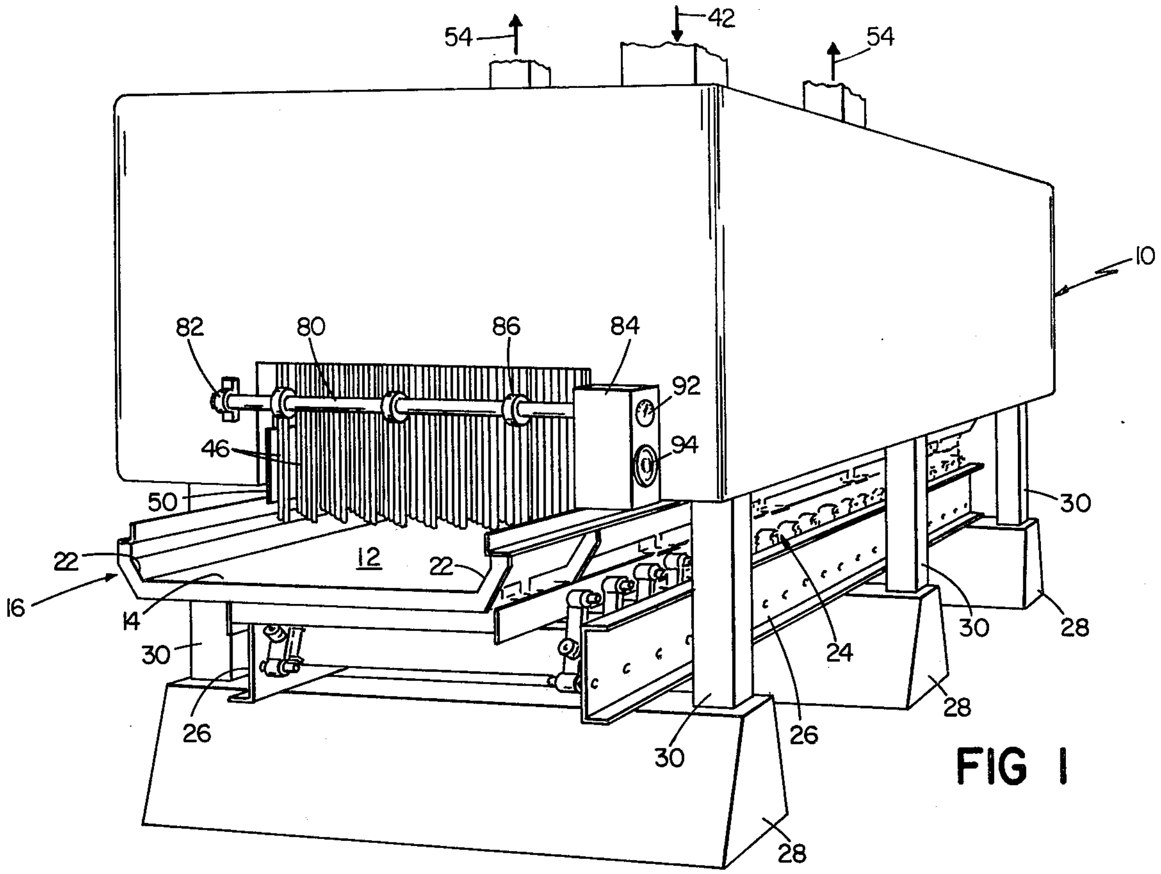
FIG. 1 is a perspective view of particle treatment apparatus in accordance with the invention.
Figure 2:
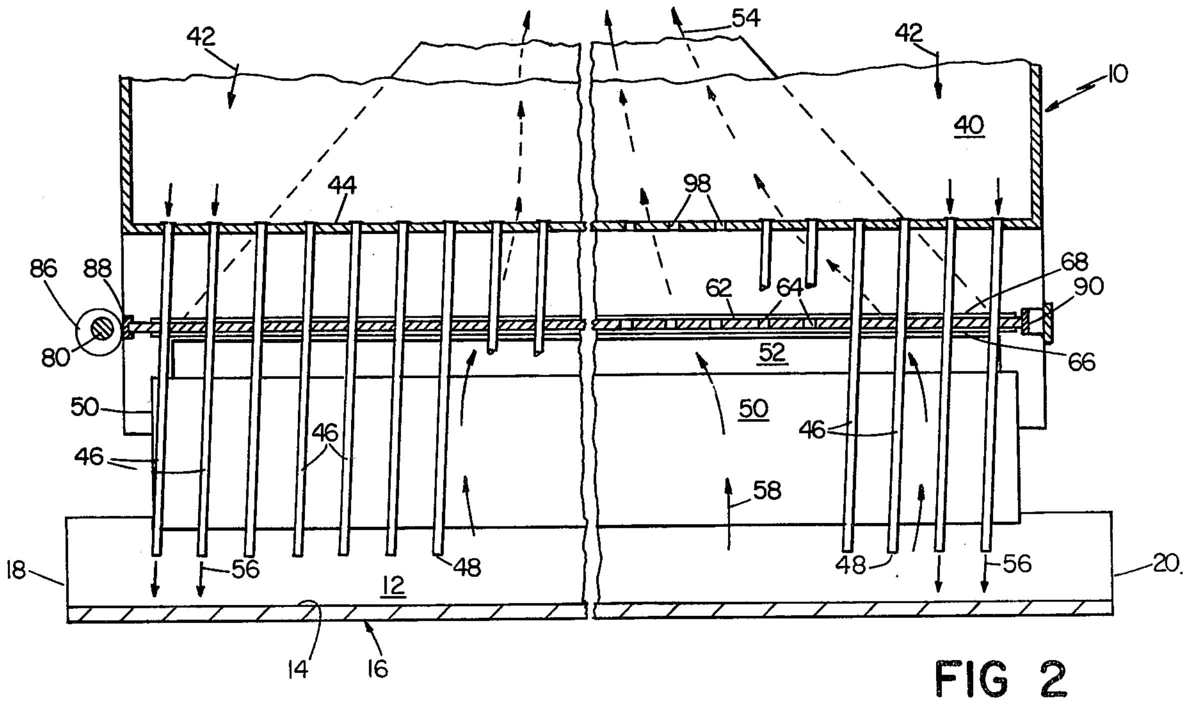
FIG. 2 is a diagrammatic sectional side view of the apparatus shown in FIG. 1.

The particle treatment apparatus shown in FIGS. 1 and 2 include insulated housing 10 disposed above a treatment zone 12, the bottom margin of which is defined by horizontal surface 14 of conveyor pan 16. In this embodiment, the treatment zone 12 is $3\frac{1}{2}$ feet in width and twenty feet in length. Conveyor pan structure 16 has open entrance end 18 and open discharge end 20. On either side of horizontal base 14 is an inclined side wall 22. Drive mechanism 24 imparts oscillatory motion of about one inch amplitude to conveyor pan 16. Longitudinal frame members 26 support the oscillator drive and conveyor pan 16 and are in turn are supported on transverse foundation members 28. Columns 30 support housing 10 above conveyor pan 16.

Housing 10 defines in its upper portion a supply plenum 40. Conditioned gas is supplied through an opening in the upper wall of housing 10 for flow, as indicated by arrow 42, into plenum 40. Extending downwardly from the base wall 44 of supply plenum 40 is an array of elongated tubes 46 that extends over the length and width of the treatment zone 12. Each tube 46 is of twenty gauge metal and has a ⅝ inch diameter orifice at its lower end 48 and is twenty-four inches long. The tubes are arranged in a regular array with tubes spaced on 3½ inch centers transversely of the array and with the transverse rows of tubes spaced lengthwise at intervals of 2½ inches on center. The lower ends 48 of tubes 46 are spaced generally in the range of three to six inches from conveyor pan surface 14. Vertical side walls 50 extend along either side of the array of tubes 46 and define side boundaries of the treatment zone. In the upper portion of each side wall 50 is an elongated exhaust port 52 which communicates with exhaust passages that extend upwardly along each side wall of housing 10 to exhaust outlets in the top wall of the housing as indicated by arrows 54. The gas, typically air, preferably flows through a recirculation path from exhaust passages 54 through a suitable filtering mechanism such as a cyclone, a blower, and conditioning apparatus such as a heater or cooler, for return to supply plenum 40 through inlet port 42. The gas flows from supply plenum 40 downwardly through nozzle tubes 48 for flow into the treatment zone 12 in an array of gas jets indicated by arrows 56, and is discharged upwardly from treatment zone 12 at lower velocity as indicated by arrows 58 and through exhaust ports 52.

The apparatus includes a jet angle adjustment mechanism for changing the angular orientation of the tube array uniformly for accelerating or retarding the transit of particles through the treatment zone from the entrance end 18 to the discharge end 20. That adjustment mechanism includes tube sheet 62 with apertures 64 through which the nozzle tubes 46 pass. Tube sheet 62 is supported for longitudinal sliding movement relative to fixed upper tube sheet 44 by longitudinally extending support flanges 66 and guide flanges 68 that extend inwardly from side plates 70 of the removable tube sheet assembly units 72. The adjustment mechanism includes cam shaft 80 (FIGS. 1 and 2) that extends transversely of housing 10 at the input end as mounted in suitable bearing supports 82, 84. Fixed to cam shaft 80 are series of cams 86 which act against follower surface 88 of tube sheet 62. Surface 88 is biased against cams 86 by springs 90 and at the opposite (discharge) end of the apparatus as indicated in FIG. 2. Rotation of shaft 80 causes eccentric cams 86 to shift sheet 62 longitudinally to adjust the inclination angle of the array of nozzle tubes 46. In the position indicated in FIG. 2, the nozzle tubes 46 are set at an angle of about three degrees retard. Indicator 92 is coupled to and driven by shaft 80 and is calibrated in terms of angle of jets 46. Cam shaft 80 is manually rotated by drive 94 through a transmission link (not shown) but may be power driven as desired.

Figure 3:
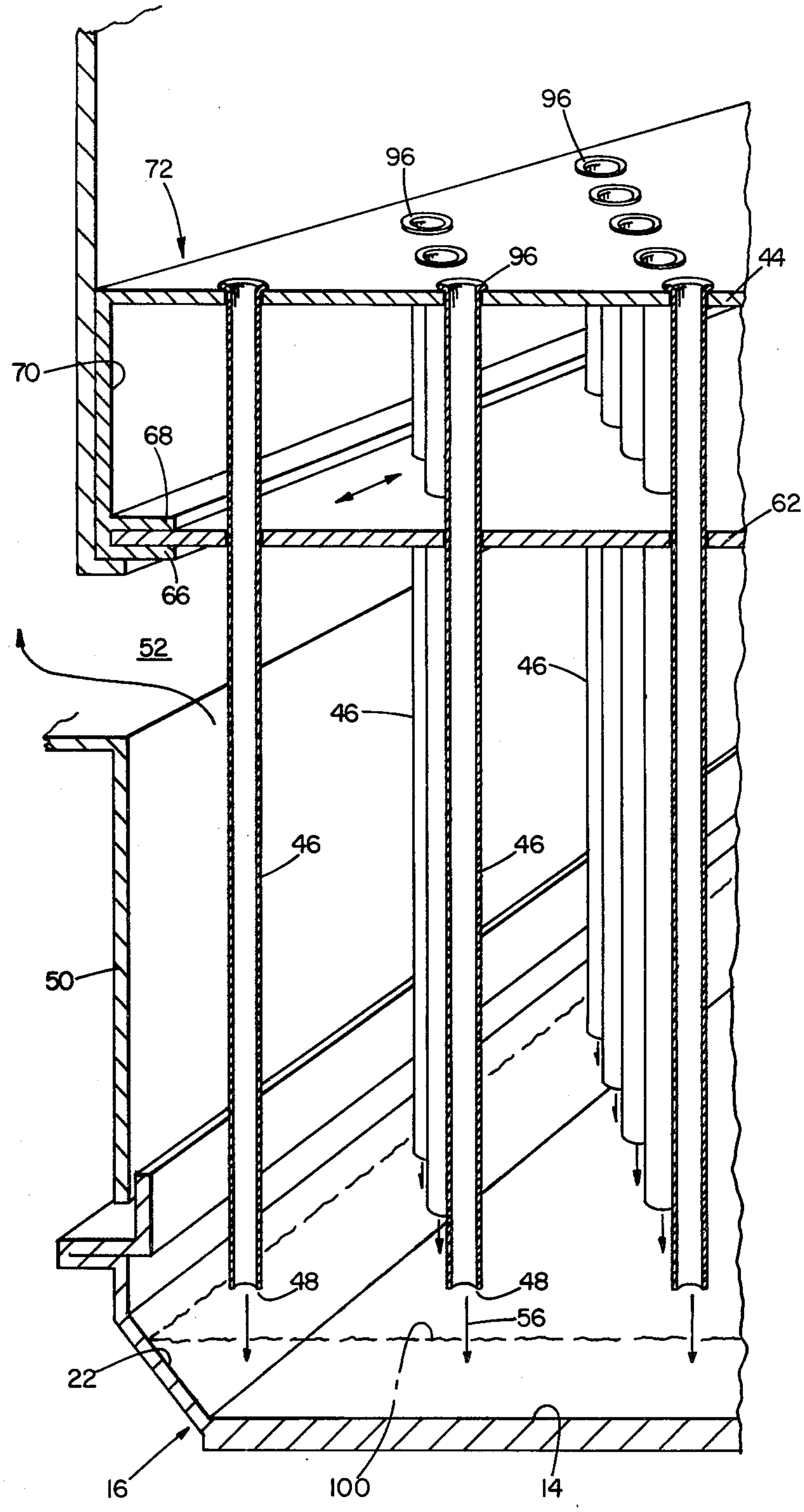
FIG. 3 is a perspective view of a portion of the tube array and pan structure of the apparatus shown in FIG. 1.

FIG. 3 is a perspective view indicating a portion of the tube array and conveyor pan 16. As indicated in FIGS. 3 and 4, the upper end 96 of each tube is flared outwardly so that it provides a pivot support when seated in its aperture 98 of tube sheet 44. The apertures 64 in adjustment sheet 62 are slightly elliptical to accommodate the tubes 46 in their shifted position, with the sides of apertures 64 stabilizing the tubes laterally. Rearward sliding movement of sheet 62 shifts the tubes 46 in unison to the adjusted retard angle A, while forward sliding movement of sheet 62 shifts the tubes to adjusted accelerate angle B.

Tube array units 72, including the upper and lower tube sheets and support and guide flanges 66, 68, are conveniently removable from the housing 10 for change of tube size or replacement of tubes. It will be apparent that either tube sheet 44 or 62 or both may be shiftable. In particular applications a supplemental tube sheet may be supported on guide flanges 68 in fixed position. That supplemental sheet has guide apertures for tubes that do not move and clearance apertures for other tubes which are driven by the shiftable sheet 62. Similarly, sheet 62 is provided with clearance apertures for the fixed tubes.

The circulated gas provides an array of high velocity jets 56. The jet velocity is a function of parameters of the particles being processed and is selected so that the particles are agitated and fluidized by the jets. As indicated in FIG. 3, the jets 56 flow downwardly through the bed 100 of particles and are deflected radially by pan surface 14 directly beneath the jets. The downward gas flow down through the bed of particles, outward radial deflection and then flow upwardly from the particle bed at markedly reduced velocity and out through the exhaust ports 52 produces an expansion and aeration of the particle bed 100. The inclined side walls 22 at the edge of the treatment zone aid in returning particles inwardly towards the bed and in prevently stagnation of particles along the edges of the treatment zone 12. When the temperature of the gas, usually air, in the jets 56 is different from that of the particles, a heat exchange takes place and the particles may be either cooled or dried (e.g. have moisture removed) by their contacting relation with the gaseous streams. The temperature of the gas emanating from different rows of nozzles may be varied as desired, but the weight of gas issuing from the nozzles generally is uniform unless the density of the particles changes along the path of advance due to the treatment, in which case equal amounts of fluidization may be maintained throughout the treatment zone with velocity gradients with gas at the same temperature or with temperature change in the gas of the same velocities, or both, to compensate for a change in particle density. Also, thicker particle beds caused by greater feed volumes require greater velocities to maintain fluidization, again depending upon particle density. Air velocities of about twelve thousand feet per minute are used in roasting approximately one hundred pounds of cocoa beans per hour per square foot of conveyor surface 14 in apparatus having a twenty foot long treatment zone.

Adjustment of gas jet impingement angle over a limited range so that effective particle fluidization is not impaired is used to retard or accelerate the conveyance of particles through treatment zone 12. The diagrams of FIGS. 4*a* and 4*b* show an oscillating conveyor pan 16 (the oscillating motion being indicated by arrows 108)

and an array of tubes 46 with a forwardly inclined angle of about three degrees so that the impinging jets 56 have a resultant forward velocity component. The particle fluidization pattern areas 110 resulting from the impinging jets 56 of the particles 100 are diagrammatically indicated in FIG. 4*b*, as elongated in the forward direction. In a particle processing sequence with the tubes 46 in vertical position, the oscillating conveyor drive operating at 224 cycles per minute, the velocity of jets 56 of ninety-two hundred feet per minute, the residence time of particles 100 in a treatment zone 12 ten feet in length was about seventy seconds. With the tubes 46 inclined forwardly at an angle of about three degrees, the residence time in the treatment zone 12 was reduced to about twenty-five seconds while effective fluidization was maintained throughout the treatment zone.

Figure 5A:
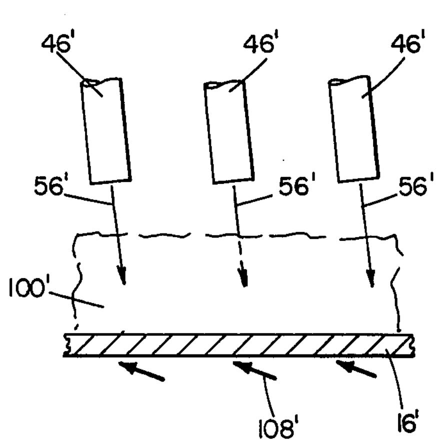
Figure 5B:
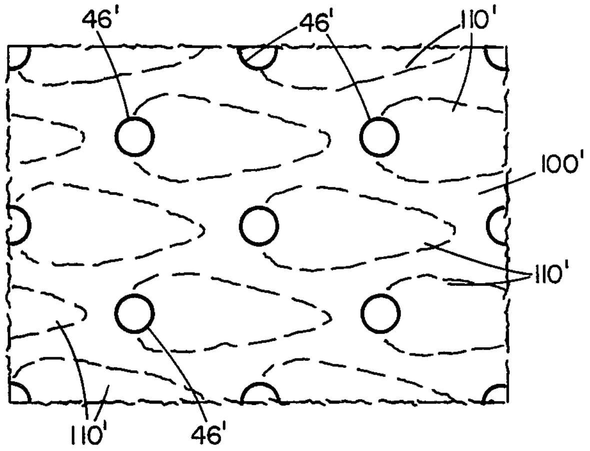

FIGS. 5*a* and 5*b* show particle fluidization action in an oscillating conveyor system with the nozzle tubes 46' inclined rearwardly at an angle of about six degrees. The particle fluidization patterns 110' are diagrammatically indicated in FIG. 5*b* as rearwardly elongated. In a process sequence employing the same tube array, the same jet velocity (ninety-two hundred feet per minute) and conveyor speed (two hundred and twenty-four cycles per minute), but with a six degree retard angle, the product residence time in the ten foot long treatment zone was increased to about one hundred and twenty-five seconds, again without impairment of effective fluidization throughout the treatment zone.

Another embodiment is shown in FIG. 6. In this embodiment, the conveyor pan 16A is of the stationary type shown in U.S. Pat. No. 3,239,377. The nozzle tubes 46A and 46B have the same length, diameter and array dimensions as in the embodiment shown in FIGS. 1–5, but nozzle tubes 46A in every other row are fixed in their normal vertical positions and the tubes 46B in the alternate rows are movable between a vertical position as indicated by arrow 56B and an inclined position as indicated by arrow 56C. Two sets of tube support sheets are employed, a fixed pair supporting the rows of tubes 46A and a shiftable pair supporting the tubes 46B. Further, in this embodiment, both the upper and lower tube sheets supporting tubes 46B are shiftable absolutely and relative to one another and are moved in coordinated manner so that the location of the tube orifices 48B remains essentially stationary as the tubes are shifted between the jet positions 56B and 56C. In this embodiment, both sets of tubes 46A and 46B in their vertical positions produce particle fluidization patterns generally of the type shown in U.S. Pat. No. 3,229,377 with continuous three-dimensional buildup of fluidizing patterns of generally circular or slightly diamond shape directly beneath each jet. At regular intervals, tubes 46B are shifted to incline the jets as indicated at 56C. The resulting increased forward component of jet velocity impinging on the particles 100A imparts supplemental advancing force to move the particles through the treatment zone. The frequency with which tubes 46B are moved into inclined position, the time intervals that tubes 46B are in vertical position and in inclined position, and the particular tubes that are moved are selected as a function of the desired processing of specific particulate materials.

While particular embodiments of the invention have been shown and described, various modifications will be apparent to those skilled in the art, and therefore it is not intended that the invention be limited to the disclosed embodiments or to details thereof and departures may be made therefrom with the spirit and scope of the invention as defined in the claims.

What is claimed is:

1. Apparatus for the substantially horizontal conveyance of solid particulate material comprising pan structure including a gas impervious base forming a transport surface having an inclination less than that which would cause gravity flow of the particulate material to be conveyed, and side walls extending along the edges of said base to form with said base an open ended trough that defines a particle treatment zone, an array of spaced nozzles extending downwardly toward said pan structure and terminating in orifices disposed to direct gas passing through said nozzles in an array of gas jets downwardly towards said base, means for changing the angle of inclination of said gas jets so that said gas jets may be inclined at a small but effective angle to the normal to said base for affecting the rate of movement of particulate material through said treatment zone, means for exhausting gases emanating from said nozzles upwardly away from said pan structure between said nozzles, and means for flowing gas through said nozzles at high velocity to fluidize particles on said pan structure, said particles advancing along said pan structure and out the end thereof under the influence of the resultant horizontal gas jet component imparted to the individual fluidized particles as a result of said inclined gas jets.

2. The apparatus of claim 1 wherein said pan structure is stationary.

3. The apparatus of claim 1 and further including means to impart oscillatory motion to said pan structure.

4. The apparatus of claim 1 wherein the angle of inclination of said gas jets is changed by movement of said nozzles.

5. Apparatus for the substantially horizontal conveyance of solid particulate material comprising pan structure including a gas impervious base forming a transport surface having an inclination less than that which would cause gravity flow of the particulate material to be conveyed, and side walls extending along the edges of said base to form with said base an open ended trough that defines a particle treatment zone, an array of spaced nozzles extending downwardly toward said pan structure and terminating in orifices disposed to direct gas passing through said nozzles in an array of gas jets downwardly towards said base, means for changing the angle of said gas jets over a range of up to about ten degrees to the normal to said base for affecting the rate of movement of particulate material through said treatment zone while maintaining effective fluidization of the bed of particles throughout said treatment zone, means for exhausting gases emanating from said nozzles upwardly away from said pan structure between said nozzles, and means for flowing gas through said nozzles at high velocity to fluidize particles on said pan structure, said particles advancing along said pan structure and out the end thereof under the influence of the resultant horizontal gas jet component imparted to the individual fluidized particles as a result of said inclined gas jets.

6. The apparatus of any preceding claim wherein said nozzles are elongated tubes, and further including a supply plenum in communication of the upper ends of said tubes.

7. The apparatus of claim 6 and further including linkage structure for moving a plurality of nozzle tubes as a unit to change the angle of inclination of gas jets from said plurality of tubes in a uniform and equal manner.

8. The apparatus of claim 7 wherein the lower ends of said tubes define orifices that lie in a common plane spaced from and parallel to said base, and the upper ends of said tubes are enlarged and are supported by a first tube sheet that defines the lower wall of said supply plenum, and said linkage structure includes a second tube sheet disposed below and parallel to said first tube sheet, and means for shifting said first and second tube sheets relative to one another in a direction parallel to the movement of particles through said treatment zone for changing the angles of inclination of said nozzle tubes.

9. The apparatus of claim 8 wherein said first tube sheet is fixed and said second tube sheet is shiftable in a plane parallel to said base lengthwise of said treatment zone.

10. The apparatus of claim 5 wherein a first group of said nozzle tubes are fixed with their axes normal to said base and a second group of tubes are shiftable to change the angle of said gas jets.

* * * * *